United States Patent
Wallace et al.

(10) Patent No.: US 7,023,361 B1
(45) Date of Patent: Apr. 4, 2006

(54) COVERT RUNWAY LIGHTING APPARATUS AND METHOD

(76) Inventors: Roger S. Wallace, 2435 Slocum Rd., Kingsley, MI (US) 49649; Renae L. Wallace, 2435 Slocum Rd., Kingsley, MI (US) 49649

( * ) Notice: Subject to any disclaimer, the term of this patent is extended or adjusted under 35 U.S.C. 154(b) by 0 days.

(21) Appl. No.: 10/706,502

(22) Filed: Nov. 10, 2003

(51) Int. Cl.
*G08G 5/00* (2006.01)

(52) U.S. Cl. .................. 340/952; 244/114 R; 340/947; 340/953

(58) Field of Classification Search .............. 340/947, 340/948, 950, 951, 952, 953, 642; 315/130, 315/13; 244/114 R; 362/262
See application file for complete search history.

(56) References Cited

U.S. PATENT DOCUMENTS

| | | | | |
|---|---|---|---|---|
| 4,382,274 A | | 5/1983 | De Backer et al. .......... 362/364 |
| 4,554,544 A | * | 11/1985 | Task .......................... 340/953 |
| 4,590,471 A | * | 5/1986 | Pieroway et al. ....... 340/825.69 |
| 4,862,164 A | | 8/1989 | Croley et al. ............... 340/982 |
| 4,924,364 A | | 5/1990 | Pannier .................... 362/153.1 |
| 5,225,828 A | * | 7/1993 | Walleston ................... 340/953 |
| 5,426,429 A | * | 6/1995 | Norman et al. ............. 340/953 |
| 5,669,691 A | | 9/1997 | Barrow .................... 362/153.1 |
| 6,113,245 A | | 9/2000 | Reinert, Sr. ............... 362/153.1 |
| 6,239,725 B1 | * | 5/2001 | Bray ........................... 340/953 |
| 6,533,446 B1 | * | 3/2003 | Chen et al. .................. 362/559 |
| 6,567,248 B1 | * | 5/2003 | Schmidt et al. ............. 362/470 |
| 6,758,586 B1 | * | 7/2004 | Wilhem et al. ............. 362/471 |

OTHER PUBLICATIONS

Galaxy Litebeams, LLC, "Landing Lights" webpage, date unknown but believed 2002, 4 pages, U.S.
Phoenix, "Infrared Flashing Beacons" data sheet from webpage, date unknown (but see attached Dec. 2001 "Friend Or Foe" military publication re: Phoenix Beacons), 2 pp. U.S.
Cooper Crouse-Hinds, "Crouse-Hinds Airport Lighting Products" catalog, 2001, Cooper Industries, Inc., U.S.

* cited by examiner

*Primary Examiner*—Brent A. Swarthout
(74) *Attorney, Agent, or Firm*—Northern Michigan Patent Law, PLC

(57) ABSTRACT

A runway lighting fixture of the type normally permanently installed at an aircraft installation such as an airport to provide visible light signals to an aircraft, the fixture having an internal, non-visible light source such as an infrared lamp capable of being activated to provide a non-visible light signal to an aircraft specially equipped to see such non-visible signals. An airport normally having arrays of permanent visibly-lighted fixtures can be equipped for long-term or permanent covert operations capability by installing covert, non-visibly-lighted fixtures in place of visibly-lighted fixtures. In a preferred form the covert fixtures are capable of being both visibly and non-visibly lighted to allow normal appearing non-covert operations at the airport, and unobtrusive covert operations whenever needed.

20 Claims, 6 Drawing Sheets

PRIOR-ART

PRIOR-ART

COVERT RUNWAY LIGHTING APPARATUS AND METHOD

FIELD OF THE INVENTION

The present invention is in the field of airport runway lighting.

BACKGROUND OF THE INVENTION

Military and other covert air operations often desire or require non-visible runway lighting markers for nighttime operations. This has been achieved with small, man-portable, battery-operated lights that emit infrared light visible only to pilots or ground personnel wearing special goggles or in specially equipped aircraft. These lights are temporarily deployed on existing airstrips and runways, or are scattered about a likely spot to create a makeshift airway, drop zone or landing zone for a few hours.

While useful in the field, these deployable covert lights are less useful for fixed, permanent runway installations such as airports where several hours may be needed to set them up, where it is not desirable for the local civilian air traffic and ground personnel to see the deployed lights (including their setup), and where several hours may be needed to retrieve them. These deployable lights are also not suitable for extended, sophisticated, large-scale air operations where aircraft need to use them for sustained periods of time or spot them many miles away, and where detailed, large-scale, easily-adjusted covert lighting patterns may be needed around the airport.

BRIEF SUMMARY OF THE INVENTION

The present invention is an apparatus and method for converting a fixed runway installation's visible runway light fixtures to include at least some covert-capable fixtures that emit a non-visible light signal, such that normal visible-light-using air traffic remains unaffected by and unaware of the covert capability. Aircraft and ground personnel equipped to see the non-visible light signals can accordingly operate and use the runway installation covertly, with or without the visible lights in operation, and without the need to wait for a temporary and obtrusive deployment of covert lights.

By runway installation is meant permanent installations that have an essentially permanently-installed array of visible runway and related light fixtures, such as civilian and military airport runways, aircraft carrier runways and helipads, and fixed drop zones used for training and emergency purposes at military and civilian airports. By runway light fixtures is meant fixtures both on and associated with runways, taxiways, drop zones, helipads and the like, useful in assisting aircraft to spot, approach, drop cargo, land and/or take off. Such fixtures include but are not limited to runway centerline lights, edge lights, threshold lights, taxiway lights, approach angle indicator lights, fixed drop zone marker lights, windspeed indicator bars, and wind direction beacons.

In a first aspect of the invention, a runway light fixture is provided with an infrared or similar non-visible light source (for example, non-visible spectrum laser light, non-visible ultraviolet light, or a controllable non-visible thermal source capable of being viewed with a passive infrared viewer) capable of being seen only by specially equipped aircraft and personnel. In a preferred form, a visible light fixture of known, ordinary-looking type is modified by replacing a visible light source inside the fixture with a non-visible light source, or replacing the fixture with the same or a similar fixture having both visible and non-visible light sources, such that the visible and non-visible light sources can be operated simultaneously or independently, depending on the lighting needs of the air traffic.

In a second aspect of the invention, some or all of the fixtures at an installation can be replaced or modified, as needed. The modified or replaced fixtures can preferably operate on the normal lighting control and power system already in place at the airport, such that maintenance personnel, air control personnel, or even the crew of an approaching aircraft can enable non-visible, covert operations with a direct or remote signal. Alternately, covert-capable fixtures can be made to have their non-visible lights activated individually and/or to use different power sources.

Although it is preferred to provide fixtures each capable of both visible and non-visible lighting, it is also possible to switch or complement one or more visible light fixtures with a corresponding number of non-visible-only light fixtures at the landing installation, such that some of the runway fixtures are purely visible fixtures and some are purely covert fixtures capable of providing non-visible light signals to an aircraft. And although most installations will be retrofits or replacements of existing visible lighting fixtures, new runway construction can be originally provided with covert dual- and/or single-mode fixtures.

These and other features and advantages of the invention will become apparent upon further reading of the specification, in light of the accompanying drawings.

DETAILED DESCRIPTION OF THE INVENTION

Figure 1:
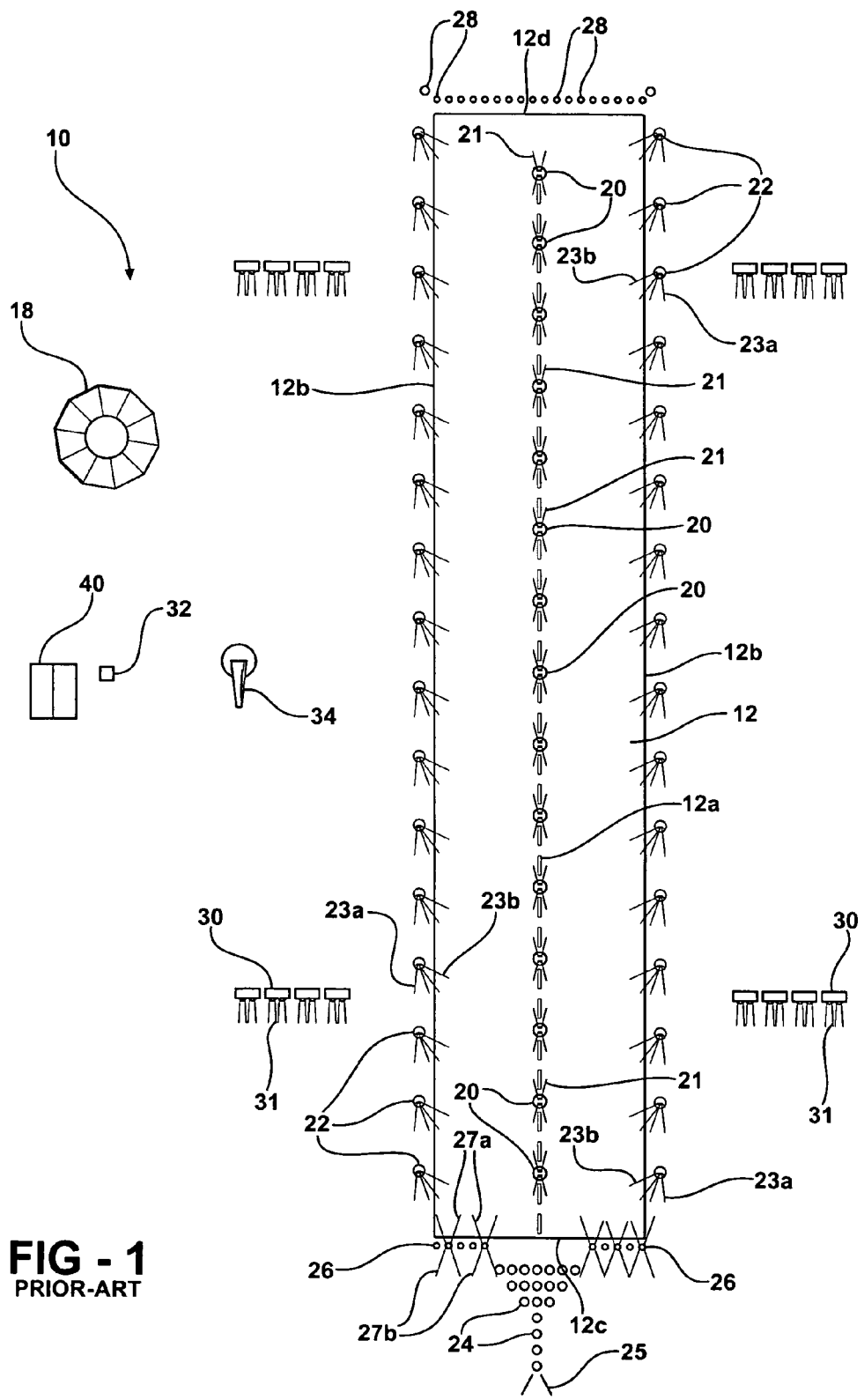
FIG. 1 is a schematic plan view of an exemplary visible lighting arrangement for an airport runway.
Figure 2:
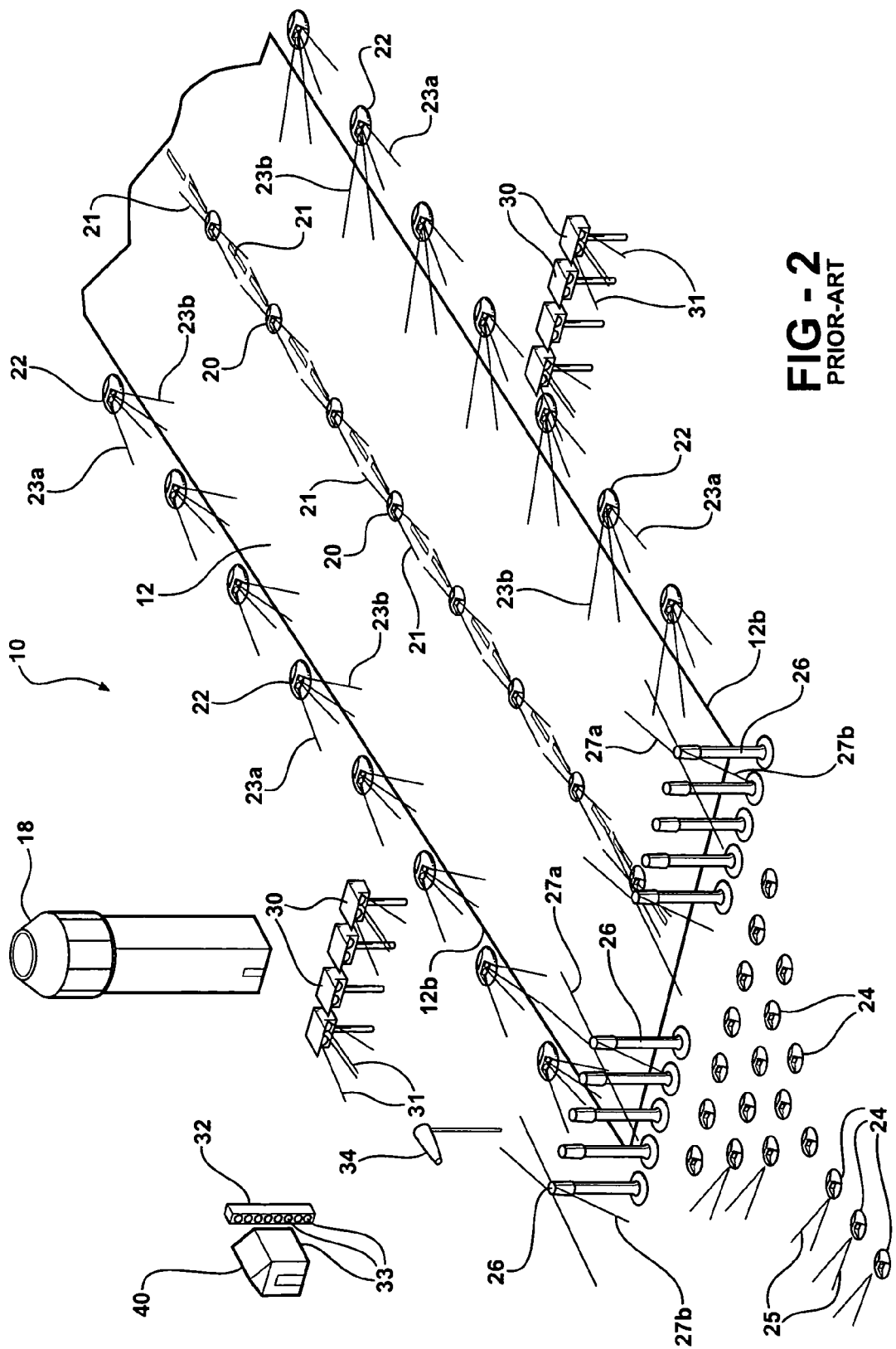
FIG. 2 is a perspective view of an approach end of the runway of FIG. 1, showing in more detail some commonly-used types and placements of runway light fixtures.

Referring first to FIGS. 1 and 2, a runway installation 10 is schematically illustrated, with a permanent paved runway 12 of known type at a commercial or military airport. Such runways may or may not have a control tower 18 nearby, depending on the size, type, and activity level of the airport. Runway 12 will, however, have an essentially permanent array of light fixtures on and around the runway and any associated taxiway and terminal structures. For simplicity only a runway 12 is shown, but it will be apparent to those skilled in the art that taxiways, terminals, and other known complementary structures requiring lighting to guide aircraft can be included in runway installation 10.

Runway 12 is typically provided with several different types of light fixture, set in different arrays for different purposes. In the illustrated example, the runway centerline 12a is marked at intervals with runway centerline lights 20 of known type, embedded flush or nearly so with the paved surface of the runway and emitting light patterns 21 aligned with the centerline in known fashion. Centerline lights 20 can vary in their construction, are available from many commercial sources, and may be unidirectional for single-direction runways or (as illustrated in FIG. 1) bi-directional for runway operation in both directions or to indicate right and wrong landing direction, for example by emitting light of different color in each direction.

The side edges 12b of the runway are marked along their length in conventional fashion with runway edge lights 22 of known type, similar to centerline lights 20 but often having two diverging or differently-angled lamps, one throwing a light pattern 23a essentially parallel to or only slightly angled in toward the runway edge, and one throwing a more strongly angled or "toed-in" light pattern 23b toward the runway centerline. Runway edge lights 22 are often mounted low or nearly flush to the ground like centerline lights 20, and may be very similar in appearance and function, such that it is known to use the same type of light fixture both for centerline and edge lighting. Runway edge lights 22, however, often have a deeper mounting base or anchor (not shown, see FIGS. 3 and 4C) in the form of a metal cylinder (commonly referred to as a "can") anchored deeply into the ground or pavement and capable of removably receiving the fixture housing the lamp and lens assemblies. Runway edge lights 22 may also be rotatably adjustable on their mounts, to vary the toe-in angle relative to the runway.

The approach end 12c of runway 12 is often marked by a geometric pattern of approach lights 24, for example in a triangle or arrowhead pattern similar to that shown in FIG. 1. In the illustrated embodiment of FIG. 1, approach lights are similar to runway edge lights 22 in their structure and their low-to-the-ground or inset mounting, but may for example have only a single unidirectional lamp emitting a light pattern 25 pointing generally in the direction of the approaching aircraft.

The actual threshold 12c of the paved runway 12 is often separately lit, for example by a straight row of vertical post-mounted type threshold lights 26 of known type, often with a multi-directional light pattern to both light the edge of the pavement (27a) and to be seen by an approaching aircraft (27b) to clearly mark the transition from approach lights 24 to the actual pavement threshold.

The end 12d of the runway, where the pavement runs out, will typically be marked with its own array of runway end indicator lights 28, which again may be post-mounted lights similar to threshold lights 26.

An aircraft's angle of approach may also be assisted with precision approach path indicator or "PAPI" lights 30, usually raised, multi-lamp, sometimes multi-color fixtures with the respective angles of the lamps themselves set such that an over/under or on/off color or light pattern 31 discernible to the approaching aircraft can be gauged for a go or no-go landing decision (for example, red-over-white OK to land, white-over-red go around again).

FIGS. 1 and 2 also show a windspeed indicator bar 32 of known type, with a vertical array of lamps 33 in mph or kph increments, for example each lit bulb denoting a 10-mph increase in windspeed. A wind-sock or -cone 34 indicates wind direction in known manner, and may be lit at night by a downwardly-angled light or lights set at the top of its pole, again in known manner.

It will be apparent to those skilled in the art of runway lighting that many variations on runway lighting patterns exist, that different types of fixture are often mixed and matched in custom arrays, that fixtures intended for one purpose (centerline lighting) may find use at a particular runway installation for a different purpose, and that other known types of runway light fixtures that have not been specifically named above are similar or equivalent to those shown herein for purpose of illustration.

Still referring to FIGS. 1 and 2, the runway light fixtures are typically powered through underground electrical conduit of known type (not shown), and often controlled at a centralized control panel or station such as a "vault" or building 40 by manual or automated switching and other controls. An operator 50 or pre-programmed control at the vault can turn individual lights and/or arrays on and off; change lighting patterns and direction; and may even be capable of selectively enabling different lamps in one or more fixtures. Such power supply and control structures and methods are well known to those skilled in the art. Control may also be from the tower 18 or even remotely, as from a radio signal transmitted from an approaching aircraft 60 in known manner to enable an automated activation of the runway lights at an unmanned airport.

Figure 3:
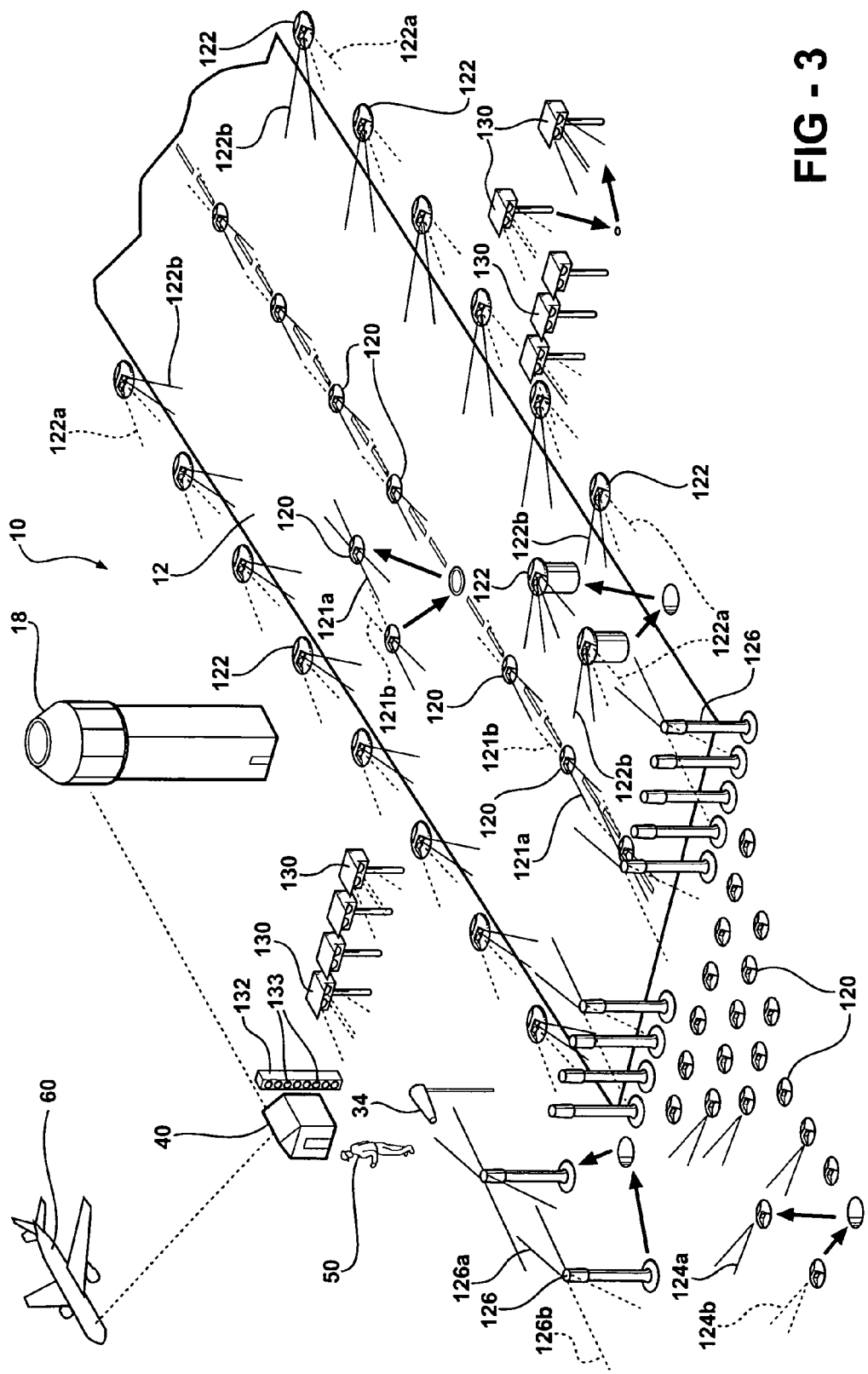
FIG. 3 is similar to FIG. 2, but with several of the visible runway light fixtures being replaced with dual-mode, infrared-capable fixtures of the same type.

Referring next to FIG. 3, installation 10 and runway 12 are shown modified according to the invention with covert-capable light fixtures, essentially identical in outward appearance to the normal visible light fixtures, but capable of emitting a non-visible light pattern instead of, or preferably in addition to, the normal visible light. In the illustrated embodiment of FIG. 3, non-visible (e.g., infrared) light patterns are illustrated in broken lines, while visible light emissions are illustrated in solid lines as in FIGS. 1 and 2. In the example of FIG. 3, centerline lights 20 have been modified or replaced with similar or identical fixtures 120 which are capable of emitting a visible light pattern 121a from the approach side and an infrared pattern 121b from the opposite side. Centerline fixtures 120 may be fixtures 20 in which a visible lamp assembly or light source has been removed and replaced with an infrared lamp assembly or light source, or may be originally built containing both visible and non-visible lamps. It will be understood that fixtures 120 could be modified or built to emit non-visible light in both directions, either for a dedicated covert runway or alternated with visible-only fixtures along the centerline, although the illustrated dual-use fixture is preferred.

In FIG. 3, runway edge lights 22 from FIGS. 1 and 2 have been modified or replaced with dual-mode fixtures 122, in the illustrated embodiment with the outer visible lamp assembly replaced with a non-visible lamp assembly. Fixtures 122 accordingly emit visible light 122*b* onto runway 12, and non-visible light 122*a* such as infrared along the runway side edges 12*b*. The toe-in angle of the non-visible light pattern 122*a* can usually be set to overlap the actual edge of the runway.

Likewise in FIG. 3, approach lights 24 have been replaced or modified with dual-mode fixtures 124 having both visible and non-visible light emissions 124*a* and 124*b*. Elevated threshold lights 26 have been replaced or modified with similar-looking fixtures 126, also with both visible and non-visible light signals 126*a* and 126*b*. Windspeed bar 32 can be modified or replaced with a bar 132 having a plurality of non-visible light sources 133 capable of displaying the same windspeed indications in conjunction with or instead of the normal visible light indications. Wind-cone 34, or at least its cone-illuminating lights, can be modified or replaced with a non-visible cone-illuminating light or lights to illuminate the cone for air- and ground-crews using proper viewing equipment.

Some of the advantages of the invention include the ability to convert an airport to covert runway lighting capability that can be activated, adjusted, and deactivated as quickly and conveniently as the normal visible runway lighting; that is unobtrusive to normal air and ground personnel during the daytime, and which can function in an essentially normal visible mode at night, when desired; that has sufficient power for extended covert use and for the non-visible lighting to be seen from long distances; and that has sufficiently detailed non-visible lighting around the runway to function as an essentially normal runway for night-vision-equipped pilots and ground crews.

It will further be appreciated that modification or replacement of existing visible-light-only fixtures can be accomplished quickly and without attracting attention, appearing, for example, as routine maintenance typical with runway lighting fixtures. This may be especially important in sensitive areas or countries, where it is not desirable for locals to know about the runway's covert capabilities. And a runway or installation so equipped can be quickly denied to or hidden from an enemy by turning off the visible lights in known manner while enabling just the non-visible lights.

FIGS. 4 and 4A–4C illustrate one of the edge runway lighting fixtures 122 from FIG. 3. In the illustrated embodiment the fixture 122 is a dual-lamp, dual-lens inset type fixture whose housing is of generally known type, but which is modified internally as to its lighting ability according to the invention. Fixture 122 has a strong, durable cover 224, for example made from cast steel or aluminum, bolted to a bottom cover or with an integrated bottom cover (FIG. 4A) to contain and support wiring, lamps, lenses, and other internal components in known manner. Fixture 122 is typically then bolted or screwed with bolts 228 to a cylindrical base. Cover 224 preferably has a rounded or beveled upper surface 230 extending only slightly above ground or pavement level and capable of withstanding aircraft wheels and runway snowplows. Side-by-side windows or lenses 232 transmit light from light sources such as incandescent/quartz and infrared lamps 240 and 242 (hidden lines) mounted inside the fixture. In the illustrated embodiment each window 232 transmits light from a separate lamp assembly. The windows are usually sealed against the elements. Light-directing channels 234 are recessed into the surface of cover 224 to help channel and define the light from each of windows 232. A rib 236 separates the channels to help maintain the distinct light beam from each window, and also serves to deflect wheels and plow blades away from the windows.

In the illustrated embodiment, fixture 122 is illustrated as having a pair of essentially unidirectional windows to make it a one-way fixture, but it is known to provide such fixtures with opposite-facing windows (and associated lights or lamps) as shown in phantom for two-way use.

Figure 4:
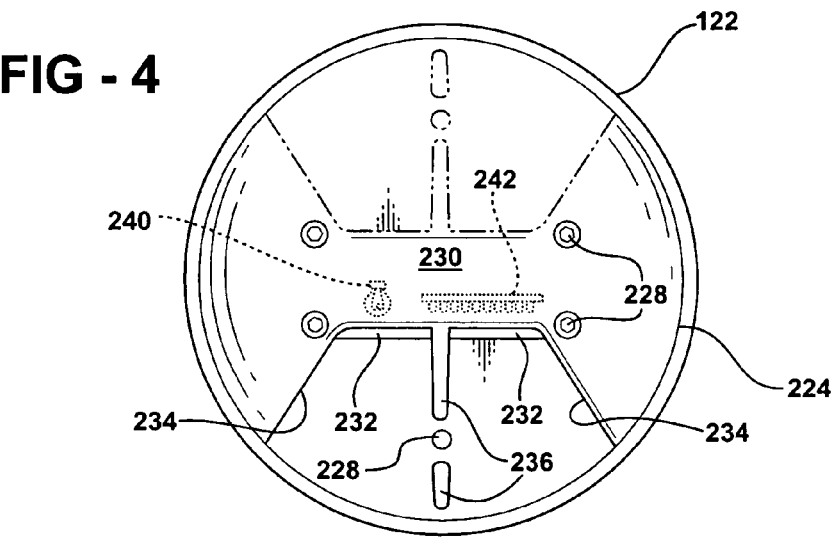
FIG. 4 is a top plan view of a common type of dual-lamp visible light fixture used to light runway edges, wherein one of the normal visible-light lamp assemblies has been replaced with an infrared lamp assembly, and with an optional set of rear-pointing lamps shown in phantom.
Figure 4A:
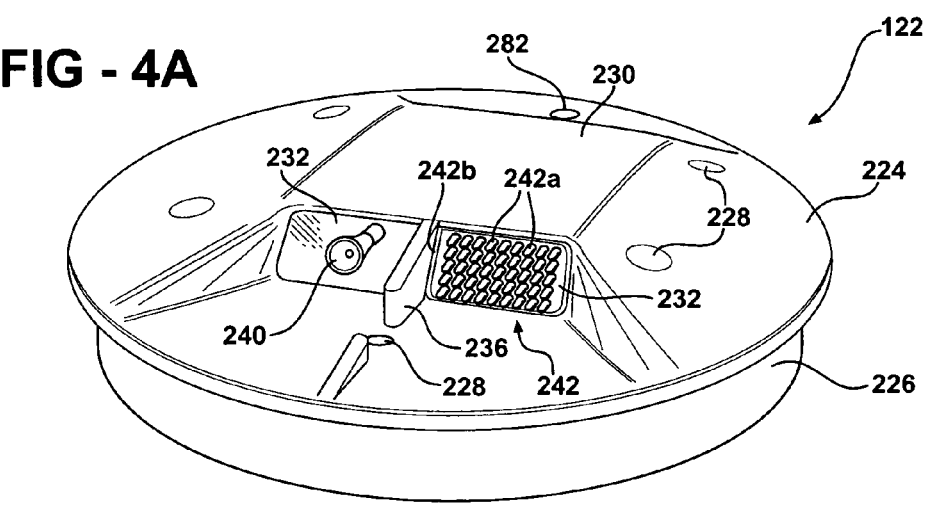
FIG. 4A is a front perspective view of the fixture of FIG. 4.

FIG. 4A illustrates the light sources behind windows 232, in the illustrated embodiment a standard incandescent or quartz lamp 240 behind one window and an infrared lamp assembly 242 behind the other window. Infrared lamp assembly 242 in the illustrated embodiment is an array of LED (light emitting diode) "bulbs" 242*a* mounted on a PC board 242*b* and emitting infrared light. Infrared LED bulbs and suitable circuitry and boards for powering and controlling them with both alternating and direct current are generally known and commercially available, and can be combined, modified, and arranged in many different ways to be powered by the conventional wiring and power connections already in a runway lighting fixture such as 122 to shine infrared light through a window or lens. Other non-visible light sources or lamps could be used in similar fashion, for example laser light sources.

Figure 4B:
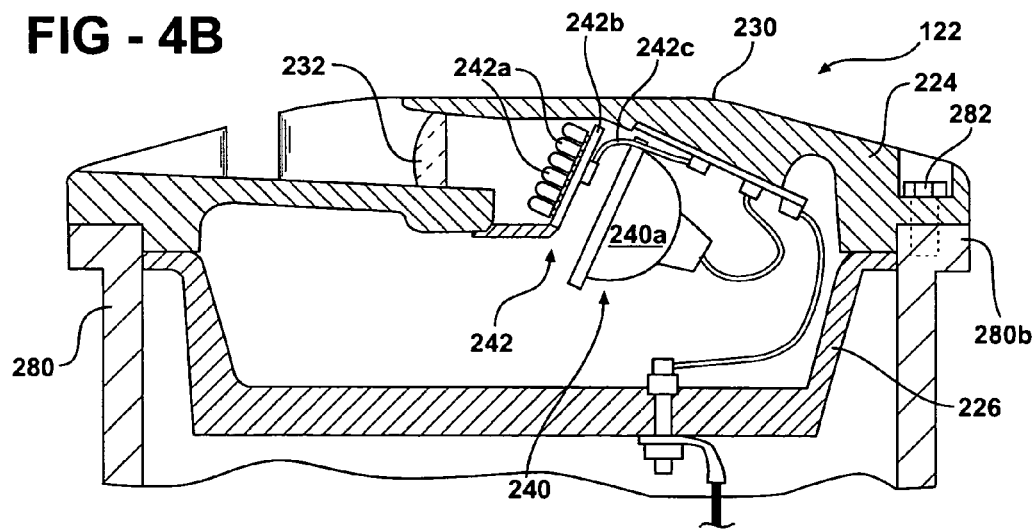
FIG. 4B is a partially sectioned side elevation view of the fixture of FIG. 4, showing the side-by-side visible and infrared lamp assemblies and an exemplary wiring and power arrangement.

FIG. 4B shows fixture 122 in section, with a standard incandescent lamp 240 having a bulb/reflector assembly 240*a* connected by wiring 240*b* to electrical power supply terminals 250 in known fashion. Terminals 250 are supplied with electrical power from an external source through wire connection to an external power conduit 272, for example with a sealed connector plug 270 attached to bottom cover 226 and making a sealed electrical connection through the cover to terminals 250. Power conduit 272 brings electrical power, usually high voltage (240V or 120V) alternating current, from a centralized source or substation such as the control vault in serial or parallel fashion to one or more runway lighting fixtures.

The non-visible (infrared) lamp assembly 242 in fixture 222 is connected through its PC board 242*b* by wiring 242*c* to power terminals 250, to use the same electrical power supplied to the incandescent/quartz lamp assembly. It may be desirable for the infrared assembly 242 to use the same power supply from terminals 250, but a different voltage or even a different type of current (for example, direct current) to light the LED bulbs. For this purpose a transformer or converter of known type (not shown) can be connected between board 242*b* and terminals 250 in known fashion. It may be desirable for the infrared lamp assembly 242 to have its own independent power supply, for example a separate external conduit or a manually or remotely activated internal battery in the fixture as primary or backup power, but piggybacking the infrared assembly to the same power supply used by the standard incandescent lamp assembly and fixture is preferred.

Figure 4C:
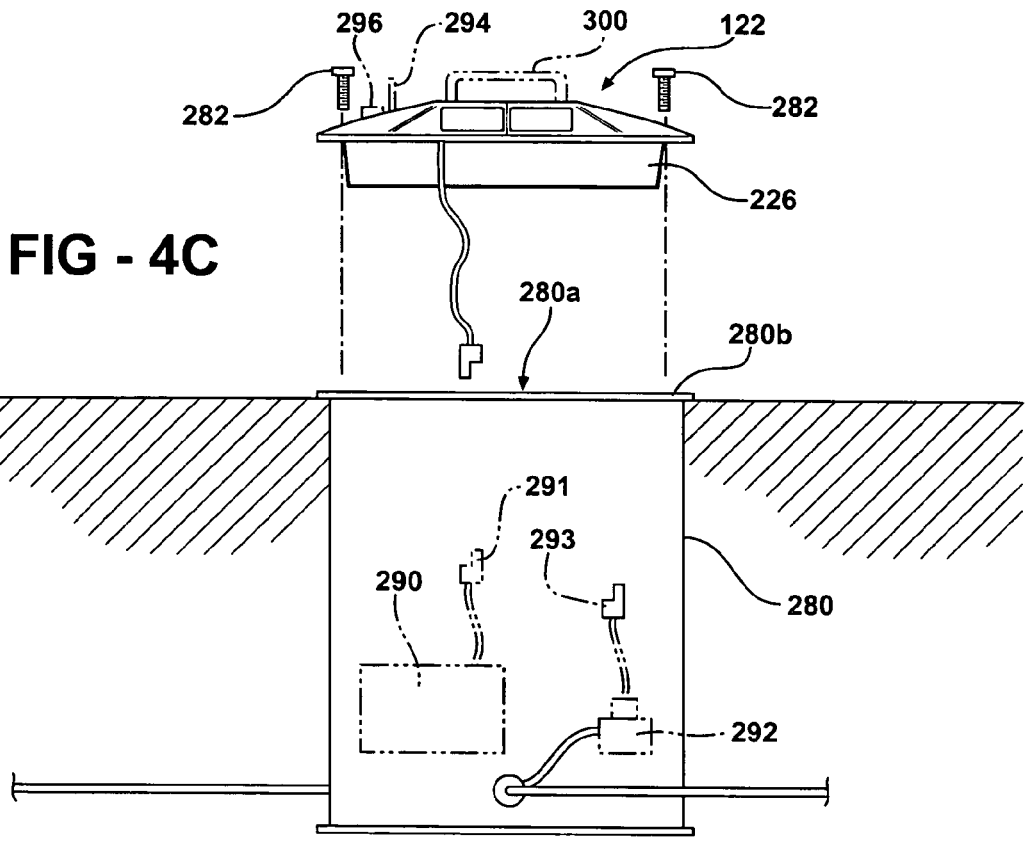
FIG. 4C is an exploded assembly view of the fixture of FIG. 4, with the lamp-containing fixture removed from a common type of ground-embedded base and with an optional power supply illustrated in the base in phantom.

FIG. 4C illustrates an optional mounting arrangement for fixture 122, in which the fixture is mounted to a deep cylindrical "can" or base 280 of known type, usually made from steel or aluminum and set into the ground or runway pavement in a concrete footing 281. Base 280 is essentially a sealed, hollow cylinder, with an upper opening 280*a* and a rim or flange 280*b* designed to receive and support fixture 122. The fixture 122 is removably secured to base 280 with bolts or screws 282, such that the fixture can be detached for maintenance or repairs. Bases such as 280 provide a convenient support and junction for electrical power, and typically will have one or more openings or hubs for admitting a power cable or conduit in sealed fashion to be connected inside the can, by connector plug or otherwise, to the lamp assemblies in fixture 122. In the illustrated embodiment, base 280 contains one or more power regulating or supply options such as a self-contained battery 290 and/or a voltage transformer or converter 292 connected to the infrared lamp assembly in fixture 122 with suitable wire or plug connections.

FIG. 4C also illustrates some optional external features of fixture 122 itself. Because the invention is especially useful for unobtrusively replacing conventional visible light fixtures around a runway, a fold-away carry handle 300 is preferably built into the top cover 224 of the fixture to facilitate transport, installation, and removal of the fixture from its base 280 or other mounting location. In some circumstances it may be desirable to replace a standard visible-light fixture with a covert-capable fixture such as 122 having its own independently operated internal power supply and/or control features. Such control features can include turning the infrared lamp on and off independently of the visible lamp assembly, or adjusting the infrared lamp's operation from a steady burn to a flashing mode, or changing from one flashing mode to another, or function testing. External manual control switches 294, 296 can accordingly be placed unobtrusively on the exterior of the top cover 224 to be accessed by knowledgeable ground personnel for operation or adjustment of the infrared lamp assembly.

Figure 5:
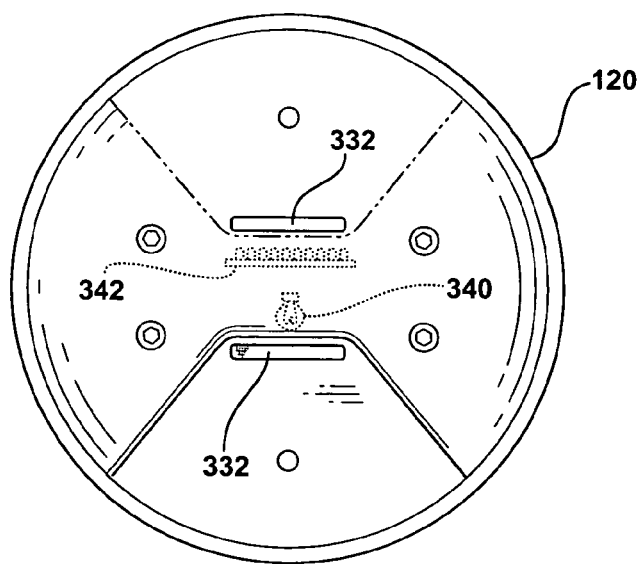
FIG. 5 is a top plan view of a dual-direction light of a type often used to light runway centerlines, with a single visible lamp pointing to the front and modified according to the invention with a single non-visible lamp pointing to the rear.

FIG. 5 illustrates an alternate type of fixture embodying the invention, such as one of the two-way centerline fixtures 120 from FIG. 3. Fixture 120 has two window/lens assemblies 332 pointing in opposite directions. A visible lamp assembly 340 is located behind one window 332 on one side and an infrared lamp assembly 342 behind the other window on the opposite side. It will be understood that fixture 120 is just one additional example of a known type of runway lighting fixture modified with an internal infrared or other non-visible light source. Virtually any runway lighting fixture with one or more visible lamp assemblies can be modified by replacing a visible lamp with a non-visible lamp or light source, or by adding a non-visible light source to complement a visible lamp assembly; or, can be originally manufactured with both non-visible and visible lamp assemblies.

Although the foregoing embodiments show separate windows or lenses for each lamp assembly, it is also possible to place both a visible and an infrared lamp assembly in a runway lighting fixture to shine through a common lens or window. Operation can then be one at a time, or in some cases simultaneously, where, for example, a different signal or intensity or pattern of infrared light would be visible to an infrared-equipped covert pilot while the normal visible signal remained available to normal pilots.

Figure 6:
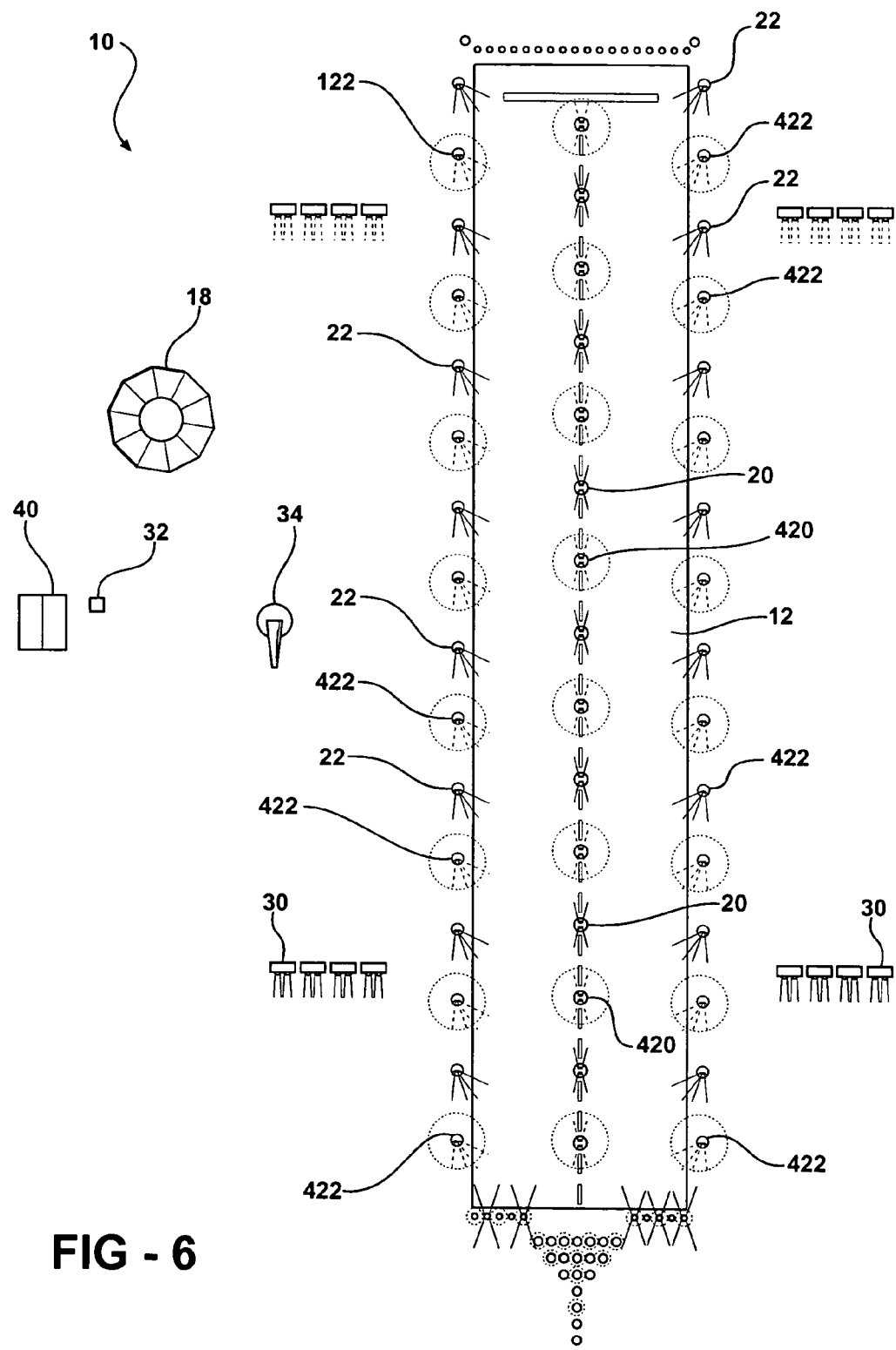
FIG. 6 is a plan view of the runway installation of FIG. 1, with a number of the runway light fixtures modified or replaced according to the invention and operating in covert mode by emitting non-visible light, as indicated by broken lines.

FIG. 6 illustrates an alternative example of the invention, in which some but not all of the runway lighting fixtures at the runway installation 10 of FIG. 1 have been modified or replaced with covert-capable lighting fixtures. In FIG. 6 approximately every other fixture among the centerline and edge arrays 20, 22 is a covert-only fixture 420, 422 similar to fixtures 120, 122 in FIG. 3, but each with two non-visible lamps to emit only infrared or other non-visible light patterns or signals as illustrated in broken lines. It will be understood that the use of staggered or otherwise intermixed covert fixtures could also be achieved with dual-mode fixtures as shown in FIG. 3.

The foregoing examples of the invention are preferred and alternate embodiments for purpose of explanation. It will be understood by those skilled in the art that the invention can be implemented in ways other than these specific examples without departing from the scope of the invention as defined by the following claims, now that we have disclosed the invention with these examples.

We claim:

1. In a permanently installed runway lighting fixture at an aircraft landing installation comprising a permanently installed array of visible-lighting fixtures comprising visible light sources electrically interconnected to said control means remote from said fixtures and normally used to provide non-covert visible lighting to non-covert air traffic, the improvement comprising:

a non-visible light source mounted in the fixture and electrically interconnected to said array of visible lighting fixtures and said control means and capable of being selectively activated by said control means to provide covert lighting for covert air operations using the permanently installed fixture in the permanently installed array.

2. The runway lighting fixture of claim 1, wherein the fixture has a housing of a type normally used for non-covert, permanent installation at the aircraft landing installation.

3. The runway lighting fixture of claim 2, wherein the fixture normally has two visible light sources, and one of the visible light sources is replaced with the non-visible light source.

4. The runway lighting fixture of claim 2, wherein the fixture is normally powered from an external source of power at the aircraft landing installation, and the non-visible light source is connected to the fixture to use the external source of power.

5. The runway lighting fixture of claim 1, wherein the visible light source is associated with a first light-emitting window in the fixture, and the non-visible light source is associated with a second light-emitting window in the fixture.

6. The runway lighting fixture of claim 2, wherein the fixture is adapted to be removably secured to a mounting base installed at the aircraft landing installation.

7. The runway lighting fixture of claim 6, wherein the base is a can-type base permanently embedded in the ground or runway pavement, and the fixture is an inset type secured to the top of the can.

8. The runway lighting fixture of claim 7, wherein the base has a power connection to an external source of power at the aircraft installation, and the fixture has a detachable connection to the power connection in the base.

9. The runway lighting fixture of claim 1, wherein the non-visible light source and the visible light source are independently powered.

10. The runway lighting fixture of claim 9, wherein the fixture includes a source of battery power for the non-visible light source.

11. The runway lighting fixture of claim 10, wherein the fixture includes a manual actuator for the non-visible light source.

12. A method for covertly lighting an aircraft installation having a plurality of permanently installed, non-covert runway lighting fixtures electrically interconnected to control means remote from said fixtures and producing visible, non-covert light signals to guide aircraft, comprising the following steps:

installing a plurality of covert runway lighting fixtures that appear to be non-covert fixtures permanently installed at the aircraft installation and electrically interconnected to said non-covert runway lighting fixtures and said control means, the covert runway lighting fixtures capable of producing a non-visible, covert light signal to guide aircraft equipped to see the covert light signal, and selectively activating the covert runway lighting fixtures by use of said control means.

13. The method of claim 12, wherein the step of installing covert runway lighting fixtures includes the step of replacing existing, non-covert fixtures.

14. The method of claim 13, further including the step of connecting the covert fixtures to use the same source of power as the non-covert fixtures they replace.

15. The method of claim 12, wherein one or more of the covert fixtures is capable of emitting both non-visible covert light signals and visible non-covert light signals.

16. The method of claim 12, wherein the covert fixtures are substantially similar in appearance to the non-covert fixtures.

17. The method of claim 16, wherein one or more non-covert fixtures is replaced with an externally identical covert fixture.

18. The method of claim 17, wherein a non-covert fixture having one or more visible light sources is removed and modified with one or more non-visible light sources.

19. A covert runway lighting fixture for permanent installation at an aircraft landing installation having visible runway lighting fixtures electrically interconnected to control means remote from said fixtures, comprising a non-visible light source in the fixture adapted to be electrically interconnected to said visible runway lighting fixtures and said control means and a fixture housing externally similar to a visible runway lighting fixture housing lighting said non-visible light source being selectively activated by said control means.

20. The runway lighting fixture of claim 1, wherein the fixture also includes a visible light source for normally providing non-covert visible lighting to non-covert air traffic.

* * * * *